United States Patent [19]

Borowiec et al.

[11] Patent Number: 5,047,692
[45] Date of Patent: Sep. 10, 1991

[54] INTEGRATED TUNING CAPACITOR NETWORK AND HEAT SINK FOR AN ELECTRODELESS HIGH INTENSITY DISCHARGE LAMP BALLAST

[75] Inventors: Joseph C. Borowiec; Sayed-Amr A. El-Hamamsy, both of Schenectady, N.Y.

[73] Assignee: General Electric Company, Schenectady, N.Y.

[21] Appl. No.: 472,144

[22] Filed: Jan. 30, 1990

[51] Int. Cl.⁵ .................................. H05B 41/16
[52] U.S. Cl. ................................ 315/248; 315/344
[58] Field of Search ........... 315/248, 344, 39, 111.51, 315/239, 124; 313/153

[56] References Cited

U.S. PATENT DOCUMENTS

| | | | |
|---|---|---|---|
| 4,390,813 | 1/1983 | Stanley | 315/248 |
| 4,415,838 | 11/1983 | Houkes | 315/248 |
| 4,748,383 | 5/1988 | Houkes | 315/248 |
| 4,783,615 | 11/1988 | Dakin | 315/248 |
| 4,810,938 | 3/1989 | Johnson et al. | 315/248 |
| 4,818,916 | 4/1989 | Morrisroe | 315/111.51 |
| 4,888,528 | 12/1989 | Byszewski | 315/124 |
| 4,894,591 | 1/1990 | Witting | 315/248 |
| 4,910,439 | 3/1990 | El-Hamamsy | 315/248 |

Primary Examiner—Eugene R. LaRoche
Assistant Examiner—Amir Zarabian
Attorney, Agent, or Firm—Jill M. Breedlove; James C. Davis, Jr.; Marvin Snyder

[57] ABSTRACT

A ballast for an electrodeless high intensity discharge lamp comprises a Class-D power amplifier including an integrated tuning capacitor network and heat sink. A series blocking/tuning capacitor and a parallel tuning capacitor are integrated by sharing a common capacitor plate. The metal plates of the parallel tuning capacitor also comprise heat sink planes to remove excess heat from the excitation coil of the lamp. Heat sink fins are affixed to the plates of the parallel capacitor. Efficiency is maximized by matching the impedance of the ballast load network.

11 Claims, 3 Drawing Sheets

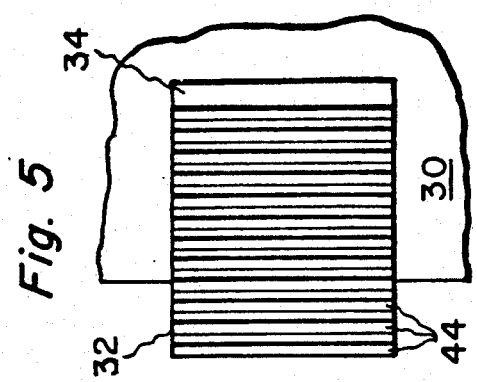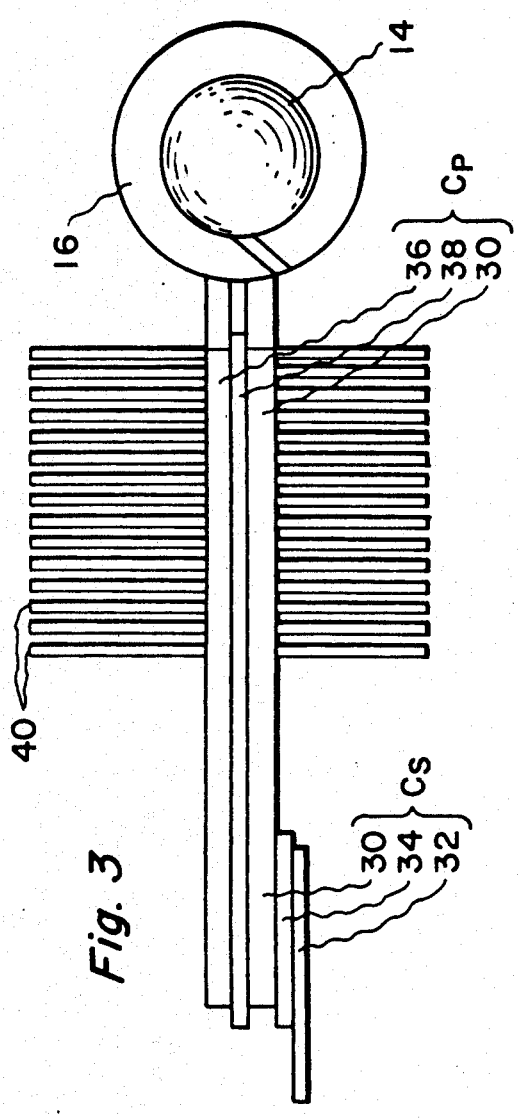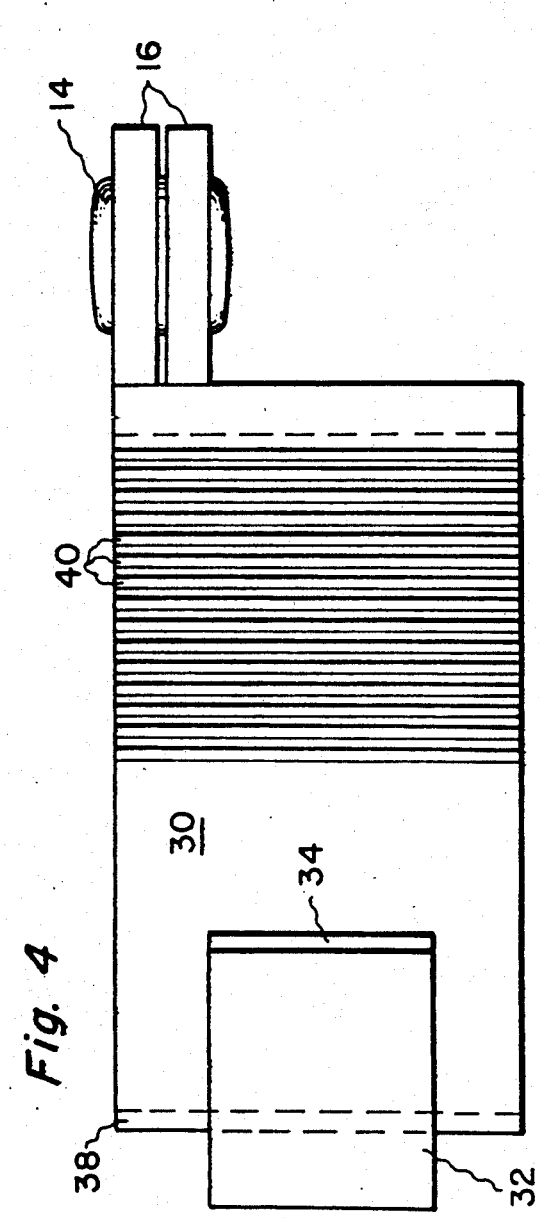

INTEGRATED TUNING CAPACITOR NETWORK AND HEAT SINK FOR AN ELECTRODELESS HIGH INTENSITY DISCHARGE LAMP BALLAST

FIELD OF THE INVENTION

The present invention relates generally to electrodeless high intensity discharge lamps. More particularly, the present invention relates to a ballast for an electrodeless high intensity discharge lamp having an integrated tuning capacitor network and heat sink.

BACKGROUND OF THE INVENTION

In a high intensity discharge (HID) lamp, a medium-to-high pressure ionizable gas, such as mercury or sodium vapor, emits visible radiation upon excitation typically caused by passage of current through the gas. In HID lamps, as originally constructed, this excitation was produced by causing a discharge current to flow between two electrodes. However, a major cause of early electroded HID lamp failure has been found attributable to at least two inherent operational characteristics of such lamps. First, during lamp operation, sputtering of electrode material onto the inner surface of the lamp envelope is common and impedes optical output. Second, thermal and electrical stresses often result in electrode failure.

Electrodeless HID lamps do not exhibit these life-shortening phenomena found in electroded HID lamps. In one class of electrodeless HID lamps, an arc discharge is generated by establishing a solenoidal electric field in the gas. In particular, a solenoidal electric field is created by the varying magnetic field of an excitation coil. Current flows through the gas, thereby producing a toroidal arc discharge. Advantageously, this class of electrodeless HID lamps generally exhibits higher efficacy than standard electroded HID lamps.

The excitation coil of an electrodeless HID lamp surrounds the arc tube. As a result, the coefficient of electromagnetic coupling between the coil and the solenoidal discharge is relatively low, typically in the range from 0.2 to 0.4. Therefore, in order to produce a predetermined discharge current in the arc tube, an even larger current is required in the coil. The relatively large coil current results in resistive losses in the coil that can have a significant deleterious effect on efficiency of the overall HID lamp system. Moreover, as the temperature of the excitation coil increases, coil resistance increases. Hence, to increase efficiency of an electrodeless HID lamp system, heat resulting from coil resistive losses and from convection from the hot arc tube to the coil must be removed by an effectual method of heat sinking. Furthermore, although improvements in heat sinking are desirable for HID lamps, such improvements must not interfere appreciably with the visible light output of these lamps.

In accordance with the foregoing, to maximize efficiency of an HID lamp, the degree of coil coupling between the magnetic field and the arc discharge must be maximized. Since the degree of coupling increases with frequency, electronic ballasts used to drive HID lamps operate at high frequencies in the range from 0.1-20 MHz, exemplary operating frequencies being 13.56 and 6.78 MHz. These exemplary frequencies are within the industrial, scientific, and medical band of the electromagnetic spectrum in which moderate amounts of electromagnetic radiation are permissible; and such radiation generally is emitted by an electrodeless HID lamp system. Disadvantageously, at these high frequencies, switching losses associated with the charging and discharging of the parasitic capacitances of the power switching devices of an electronic ballast are generally high. Fortunately, however, a zero-voltage, i.e. lossless, switching technique, as described in commonly assigned, copending U.S. patent application of S. A. El-Hamamsy and G. Jernakoff, Ser. No. 454,614 filed Dec. 21, 1989, now allowed, may be used to improve the efficiency of the ballast. The El-Hamamsy and Jernakoff patent application is hereby incorporated by reference.

While operation of the ballast at the resonant frequency of the load circuit maximizes power output, operation at a frequency slightly lower than the resonant frequency of the load circuit maximizes ballast efficiency. Hence, for maximum efficiency, operation is slightly "off" resonance, and a specific ballast load amplitude and phase angle are required. To this end, the impedance of the ballast load, including that of the arc discharge as reflected into the ballast load, must be matched to the required ballast load resistance and phase angle. As described in commonly assigned, copending U.S. Pat. No. 4,910,439 of S. A. El-Hamamsy and J. M. Anderson, issued Mar. 20, 1990 and hereby incorporated by reference, a network of capacitors is generally used for impedance matching. According to the cited patent application, a suitable network includes a pair of capacitors connected in parallel with the excitation coil. Advantageously, these parallel connected capacitors have large plates that are also used to dissipate heat generated by the lamp coil and arc tube, i.e., for heat sinking.

Although the hereinabove described parallel capacitance has been found to be useful in matching the resistive component of the ballast load impedance, it has been determined that a series component of capacitance is needed to obtain the proper phase angle. A capacitance in series with the excitation coil must be capable of carrying large currents at the operating frequency of the lamp and be able to withstand high peak voltages applied thereto. Moreover, the conductive layers of standard RF capacitors, such as multilayered ceramic capacitors and RF transmission capacitors, are very thin and, therefore, have limited current carrying capability. Hence, to meet the current requirements with such RF capacitors, several standard valued RF capacitors must be connected in parallel. Such a configuration is usually bulky. Moreover, these RF capacitors are expensive because the manufacturing process is relatively complex and slow. Vacuum capacitors are also capable of handling the aforementioned voltage and current requirements, but are likewise too expensive, in addition to being too large, for widespread commercial applications. Thus, it is apparent that to maximize efficiency by matching the required ballast load impedance, the number of ballast circuit elements increases. Disadvantageously, as the number of circuit elements increases, so do the number of electrical leads and connections, resulting in more resistive losses. Moreover, electrical leads have parasitic inductances associated therewith which may introduce additional resonances into the ballast load circuit, as described in commonly assigned, copending U.S. patent application of S. A. El-Hamamsy, R. J. Thomas, and J. C. Borowiec, Ser. No. 454,549, filed Dec. 21, 1989, which patent application is hereby incorporated by reference. An additional resonance resulting from a parasitic inductance introduces waveform distortion and increases power dissipation, thereby reducing efficiency.

OBJECTS OF THE INVENTION

Accordingly, it is an object of the present invention to provide a high efficiency HID lamp ballast including a simplified impedance matching and resonant tuning network coupled to an excitation coil, the simplified network comprising a series capacitor and a parallel capacitor which share a common capacitor plate.

Another object of the present invention is to provide simplified heat sinking apparatus for dissipating heat generated by an HID lamp coil and arc tube, which apparatus does not interfere appreciably with visible light output.

Still another object of the present invention is to provide an HID lamp ballast employing a simplified impedance matching and resonant tuning network integrated with a heat sink in order to achieve high efficiency and minimal size of the ballast, while maximizing visible light output.

Yet another object of the present invention is to provide a simplified HID lamp ballast having a minimal number of circuit elements and electrical connections, the electrical connections being as short as possible to thereby avoid the presence of parasitic inductances while achieving high efficiency.

SUMMARY OF THE INVENTION

The foregoing and other objects of the present invention are achieved in a new and improved HID lamp ballast including an integrated tuning capacitor network and heat sink. The HID lamp ballast of the present invention comprises a Class-D power amplifier including a pair of active switching devices connected in a half-bridge configuration, and a resonant load network coupled to the junction therebetween and in parallel with one of the switching devices. The resonant load network comprises an HID lamp excitation coil, a blocking/tuning capacitor connected in series with the coil, and a tuning capacitor connected in parallel with the coil.

For maximum efficiency, the ballast operates at a frequency slightly lower than the resonant frequency, and the ballast load impedance is matched to corresponding optimum values of ballast load resistance and phase angle. The excitation coil acts as the primary of a loosely-coupled transformer, while the arc discharge acts as both a single-turn secondary and secondary load. The impedance of the arc discharge is reflected to the primary, or excitation coil, side of this loosely-coupled transformer. To match the ballast load impedance for maximum efficiency, the parallel capacitor operates with the excitation coil to match the proper resistive load value, and the series capacitor acts with the combination of the excitation coil and parallel capacitance to yield the required phase angle.

In accordance with the present invention, the series and parallel capacitors are both employed for resonant circuit tuning and impedance matching. These capacitors share a common capacitor plate and are thus integrated. Moreover, the integrated capacitor structure is integrated with a heat sink that is provided for removing excess heat from the excitation coil. By thus integrating ballast circuit elements, the number of such elements, and hence the number of electrical leads and connections, are reduced, thereby minimizing resistive losses while maximizing visible light output and improving coil efficiency by effectual heat sinking.

BRIEF DESCRIPTION OF THE DRAWINGS

The features and advantages of the present invention will become apparent from the following detailed description of the invention when read with the accompanying drawings in which:

FIG. 3 is a top view of the integrated tuning capacitor network and heat sink structure in accordance with a preferred embodiment of the present invention;

FIG. 4 is a side view of the integrated tuning capacitor network and heat sink structure of the FIG. 3;

FIG. 5 is a cutaway side view of an alternative embodiment of the integrated tuning capacitor network and heat sink of the present invention.

DETAILED DESCRIPTION OF THE INVENTION

Figure 1:
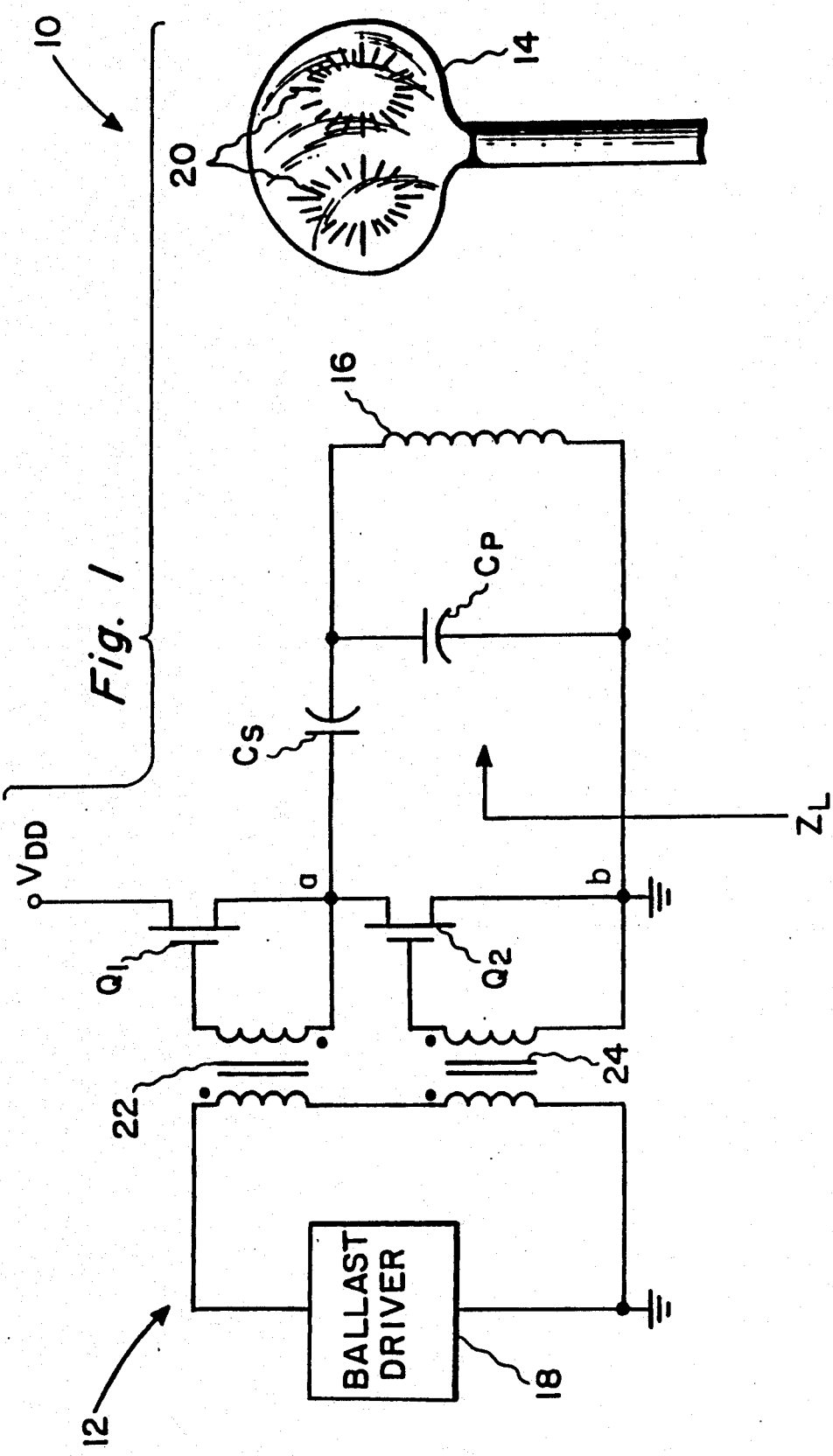
FIG. 1 is a schematic diagram of an HID lamp and ballast in accordance with a preferred embodiment of the present invention.

FIG. 1 is a schematic diagram of an electrodeless HID lamp 10 and associated ballast 12 in accordance with a preferred embodiment of the present invention. The HID lamp includes an arc tube 14 formed of a high temperature glass, such as fused quartz, or an optically transparent ceramic, such as polycrystalline alumina. Arc tube 14 contains a fill which may comprise at least one metal halide, such as sodium iodide, and a buffer gas, such as xenon. As illustrated, the preferred structure of arc tube 14 is that of a short cylinder having rounded edges. Such a structure promotes more nearly isothermal operation, thus increasing efficiency, as described in commonly assigned U.S. Pat. No. 4,810,938, issued to P. D. Johnson and J. M. Anderson on Mar. 7, 1989, which patent is hereby incorporated by reference.

Electrical power is applied to the HID lamp by an excitation coil 16 disposed about arc tube 14 which is driven by an RF signal via a ballast driver 18 and ballast 12. (For clarity of illustration, coil 16 is not shown in its operational position about arc tube 14.) A suitable excitation coil 16 may comprise a two-turn coil having two windings disposed substantially parallel to each other, as illustrated in FIGS. 3 and 4 and described below. However, other suitable coil configurations may be employed, if desired, such as that described in U.S. Pat. No. 4,970,439 of El-Hamamsy and Anderson, cited hereinabove.

In operation, RF current in coil 16 results in a changing magnetic field which produces within arc tube 14 an electric field that completely closes upon itself. Current flows through the fill within arc tube 14 as a result of this solenoidal electric field, producing a toroidal arc discharge 20 in arc tube 14. The operation of an exemplary HID lamp is described in commonly assigned Dakin U.S. Pat. No. 4,783,615, issued on Nov. 8, 1988, which patent is hereby incorporated by reference.

As illustrated in FIG. 1, HID lamp ballast 12 comprises a Class-D power amplifier including two switching devices $Q_1$ and $Q_2$ connected in series with a dc power supply $V_{DD}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 18 via input isolation transformers 22 and 24, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 18 may comprise means for generating two out-of-phase sinusoidal signals, as described in the hereinabove cited patent application of S. A. El-Hamamsy and G. Jernakoff, Ser. No. 454,614.

A resonant load network is connected to the half-bridge at the junction between switching devices $Q_1$ and $Q_2$ and in parallel with switching device $Q_2$. The resonant load network comprises the excitation coil 16 of HID lamp 10 and a tuning capacitor $C_p$ connected in parallel therewith. The parallel combination of capacitor $C_p$ and coil 16 functions as an impedance transformer to reflect the impedance of the arc discharge 20 into the ballast load. A blocking/tuning capacitor $C_s$ is connected in series with the parallel combination of coil 16 and capacitor $C_p$. In particular, resonant circuit tuning.

In accordance with the present invention, capacitors $C_s$ and $C_p$ are chosen to ensure impedance matching for maximum efficiency. That is, these capacitors are chosen to ensure that the ballast load is designed for optimum values of resistance and phase angle.

Since overall ballast efficiency depends not only on the optimum ballast load resistance and phase angle, but also on switching losses of the active devices of the Class-D amplifier circuit, it is desirable and appropriate to determine how to achieve lossless switching before determining the optimum ballast load. Lossless switching of a Class-D amplifier circuit is the subject of the copending El-Hamamsy and Jernakoff U.S. patent application, Ser. No. 454,614 cited hereinabove. According to that patent application, efficiency of a Class-D amplifier circuit is increased by optimizing the transition time between switchings of the two active devices of the half-bridge to achieve lossless switching. In particular, lossless, or zero-voltage, switching is defined as turning on or off at zero voltage across the device and zero current therethrough. As described, transition time is optimized by controlling the input voltage amplitude of the switching device depending on: the output parasitic capacitances of the switching devices, the threshold voltage of the switching devices, the power output requirement, and the load impedance.

As described in the hereinabove cited El-Hamamsy and Jernakoff patent application, the power output requirement of a Class-D amplifier ballast circuit may be expressed as follows:

$$P_o = \tfrac{1}{2} V_f I_1 \cos \phi \tag{1}$$

where $V_f$ is the amplitude of the fundamental component of the input voltage waveform at the junction between the switching devices, $I_1$ is the peak output current, and $\phi$ is the load phase angle. With voltage $V_f$, current $I_1$, and phase angle $\phi$ known from the analysis given in the El-Hamamsy and Jernakoff patent application, the above expression for power $P_o$ can be used in combination with the following expression for power $P_o$ to determine the optimum ballast load resistance $R_L$:

$$P_o = \tfrac{1}{2} I_1^2 R_L. \tag{2}$$

Figure 2A:
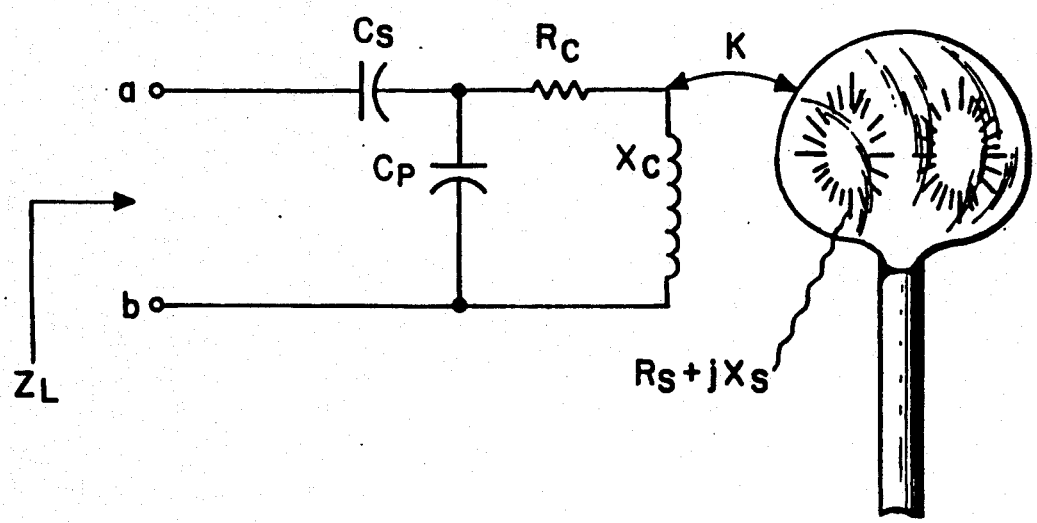
FIGS. 2A-2C are schematic illustrations of equivalent circuits of the ballast load of FIG. 1.
Figure 2B:
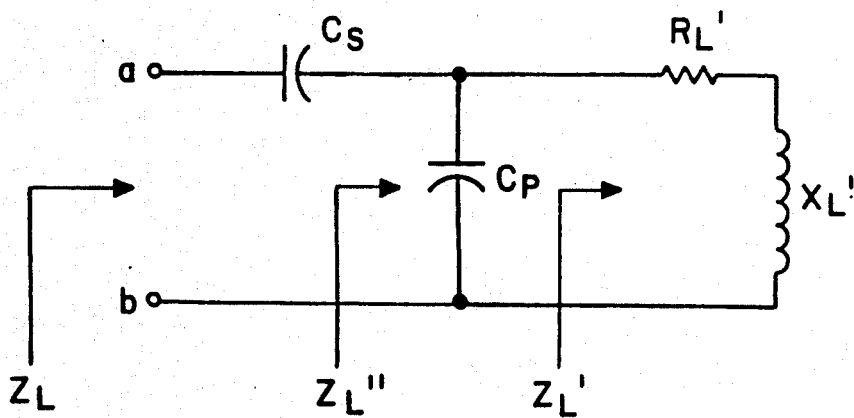
Figure 2C:
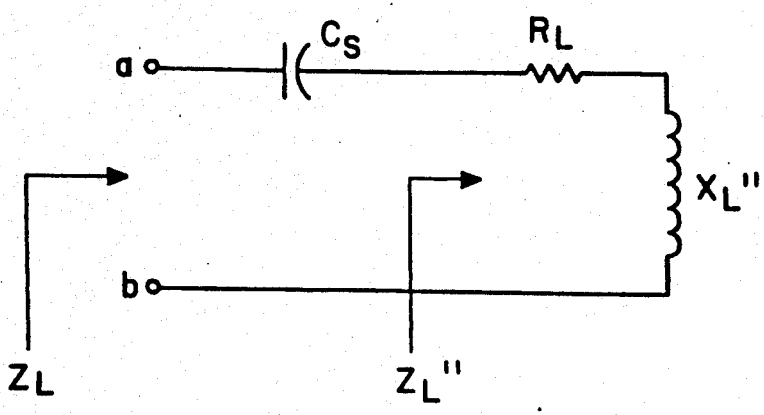

FIGS. 2A–2C are schematic illustrations of the equivalent ballast load circuit of FIG. 1 as viewed across terminals a and b. In particular, FIG. 2A shows the elements comprising the ballast load $Z_L$: series capacitor $C_s$, parallel capacitor $C_p$, coil resistance $R_c$, coil reactance $X_c$, and impedance of the arc discharge $R_s + jX_s$. FIG. 2A also shows the coupling coefficient k between coil 16 and the arc discharge.

A circuit equivalent to that of FIG. 2A is formed by combining the reflected impedance of the arc discharge with the coil impedance and is illustrated in FIG. 2B. This combined impedance is designated $Z_L'$ and may be expressed as follows:

$$Z_L' = R_L' + jX_L'. \tag{3}$$

In terms of the coil resistance $R_c$, coil reactance $X_c$, impedance of the arc discharge $R_s + jX_s$, and coupling coefficient k (all known quantities), impedance $Z_L'$ may be expressed as:

$$Z_L' = R_c + \frac{k^2 R_s X_c X_s}{(R_s^2 + X_s^2)} + jX_c \left[ 1 - \frac{k^2 X_s^2}{(R_s^2 + X_s^2)} \right]. \tag{4}$$

The impedance $Z_L'$ is in turn combined with the parallel capacitor $C_p$ to form the impedance $Z_L''$ which may be expressed as:

$$Z_L'' = \frac{\frac{Z_L'}{j\omega C_p}}{\left( Z_L' + \frac{1}{j\omega C_p} \right)}. \tag{5}$$

Furthermore, in accordance with the equivalent circuit of FIG. 2C, impedance $Z_L''$ may be expressed as:

$$Z_L'' = R_L + jX_L'' \tag{6}$$

The impedance $Z_L''$ is then combined with the series capacitor $C_s$ to form the equivalent ballast load impedance $Z_L$ which may be expressed as:

$$Z_L = R_L + j\left( X_L'' - \frac{1}{j\omega C_s} \right). \tag{7}$$

Finally, since the ballast load resistance $R_L$, load impedance angle $\phi$, peak output current $I_1$, and voltage $V_f$ across the ballast load network are known quantities (from the hereinabove analysis in combination with that of the copending El-Hamamsy and Jernakoff patent application, cited hereinabove), equations (5)–(7) may be solved to yield the optimum values of capacitors $C_s$ and $C_p$ for maximum efficiency.

In accordance with the present invention, as illustrated in FIG. 3, series capacitor $C_s$ and parallel capacitor $C_p$ share a common capacitor plate 30 and are thus integrated. Series capacitor $C_s$ further comprises another capacitor plate 32 separated from common plate 30 by a dielectric material 34. Parallel capacitor $C_p$ further comprises another capacitor plate 36 likewise separated from common plate 30 by a dielectric material 38. As shown in FIG. 3, at least a portion of series capacitor plate 32 and parallel capacitor plate 36 are each other, the eliminating need for an electric connection and hence minimizing a parasitic inductance therebetween. Suitable dielectric materials include Teflon synthetic resin polymer, mica, and Kapton polyimide film, while capacitor plates 30, 32, and 36 comprise a metal such as, for example, copper or aluminum. The capacitive value of series capacitor $C_s$ required for impedance matching is typically much less than that of parallel capacitor $C_p$; hence, series capacitor plate 32 may have less surface area than each of plates 30 and 36 of parallel capacitor $C_p$. For example, series capacitor plate 32 may have 25% of the surface area of each of the parallel capacitor plates 30 and 36.

In accordance with the present invention, the common capacitor plate 30 and the parallel capacitor plate 36 together comprise heat sink planes of a heat sink for removing excess heat from excitation coil 16. Heat in coil 16 results from RF losses in the metal comprising the coil in addition to conduction, convection, or radiation from the arc discharge 20 in arc tube 14, as illustrated in FIG. 1. As shown in FIGS. 3 and 4, heat sink fins 40 are mounted to the heat sink planes 30 and 36 for more efficient heat removal. The series capacitor plate 32 may reduce somewhat the effect of the heat sink. However, since the series capacitor plate 32 is required to be much smaller in surface area than the parallel capacitor plates 30 and 36, and hence much smaller than the heat sink planes, the detrimental effect on heat sinking is minimal. This detrimental effect is further minimized by situating series capacitor plate 32 as far as possible from excitation coil 16. Furthermore, the length of plate 30 may be increased, if desired, so that series capacitor plate 32 is even farther from coil 16. In an alternative embodiment, as shown in FIG. 5, a second heat sink, which is electrically isolated from the first heat sink, comprises heat sink fins 44 mounted on series capacitor plate 32, thus compensating for the loss in heat sinking capability resulting from the presence of series capacitor $C_s$.

Advantageously, capacitors $C_s$ and $C_p$ of the present invention are simple to manufacture, since the integrated network as described hereinabove requires only three capacitor plates and two dielectric layers. Moreover, users are not limited to standard valued capacitors (as they are with standard RF capacitors) because capacitance values may be easily varied by changing the size of the respective capacitor plates. In particular, as is well-known in the art, capacitance C of a capacitor is determined according to the following expression:

$$C = \epsilon \frac{A}{d}, \qquad (8)$$

where $\epsilon$ is the dielectric constant of the dielectric material and A and d are the surface area and thickness, respectively, of the dielectric material. Still a further advantage of the integrated capacitors described herein is that the capacitor plates are generally thicker than those or standard RF capacitors and, therefore, are capable of carrying larger currents.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. A ballast for an electrodeless high intensity discharge lamp of the type having an excitation coil situated about an arc tube for exciting a plasma discharge therein upon application of a radio frequency signal to said excitation coil, said ballast comprising:
   first and second switching devices connected in series in a half-bridge configuration with a junction therebetween;
   ballast drive means coupled to said first and second switching devices, said ballast drive means being adapted to be coupled to an RF power supply for alternately driving said first and second switching devices; and
   resonant circuit means coupled to said first and second switching devices at the junction therebetween, said resonant circuit means comprising said excitation coil, a first capacitor in parallel combination with said excitation coil, and a second capacitor connected in series with said parallel combination, said first and second capacitors each comprising a first and second metal plate with a dielectric material therebetween, said first metal plate being common to said first and second capacitors so as to comprise one of the metal plates of each of said first and second capacitors, and at least a portion of said second metal plate of each of said first and second capacitors overlapping each other so as to minimize any parasitic inductance therebetween;
   said first and second capacitors together comprising impedance matching means for matching the ballast load impedance to maximize efficiency, the capacitance of said first capacitor being optimized for matching the ballast load resistance, and the capacitance of said second capacitor being optimized for matching the ballast load angle.

2. The ballast of claim 1 wherein said first and second metal plates of said first capacitor further comprise heat sink means for removing heat from said excitation coil produced during operation of said lamp, said heat sink means comprising two heat sink planes.

3. The ballast of claim 2 wherein said heat sink means further comprises heat sink fins affixed to said heat sink planes.

4. The ballast of claim 2 wherein said second plate of said second capacitor further comprises a second heat sink means and includes additional heat sink fins affixed thereto.

5. The ballast of claim 1 wherein the surface areas of each of the two metal plates of said first capacitor are substantially equal and the surface area of said common capacitor plate is greater than the surface area of the other metal plate of said second capacitor.

6. The ballast of claim 5 wherein the surface area of the other metal plate of said second capacitor is approximately 25% of the surface area of said common capacitor plate.

7. The ballast of claim 1 wherein said metal plates are comprised of copper.

8. The ballast of claim 1 wherein said metal plates are comprised of aluminum.

9. The ballast of claim 1 wherein said dielectric material comprises Teflon synthetic resin polymer.

10. The ballast of claim 1 wherein said dielectric material comprises Kapton polyimide film.

11. The ballast of claim 1 wherein said dielectric material comprises mica.

* * * * *